(12) United States Patent
Matsumoto

(10) Patent No.: US 7,796,835 B2
(45) Date of Patent: Sep. 14, 2010

(54) COMPUTER READABLE MEDIUM FOR IMAGE PROCESSING AND IMAGE PROCESSING METHOD

(75) Inventor: Kazuhiko Matsumoto, Minato-ku (JP)

(73) Assignee: Ziosoft, Inc., Tokyo (JP)

( * ) Notice: Subject to any disclaimer, the term of this patent is extended or adjusted under 35 U.S.C. 154(b) by 798 days.

(21) Appl. No.: 11/186,068

(22) Filed: Jul. 21, 2005

(65) Prior Publication Data

US 2006/0104545 A1    May 18, 2006

(30) Foreign Application Priority Data

Nov. 18, 2004    (JP) ............................. 2004-334225

(51) Int. Cl.
  *G06K 9/36*    (2006.01)
  *G06T 17/00*   (2006.01)
(52) U.S. Cl. ...................... 382/276; 382/128; 382/282; 345/419; 345/428
(58) Field of Classification Search ................ 382/128, 382/131, 132, 154, 302; 709/203, 206, 207
  See application file for complete search history.

(56) References Cited

U.S. PATENT DOCUMENTS

| | | | | |
|---|---|---|---|---|
| 5,699,497 | A * | 12/1997 | Erdahl et al. | 345/428 |
| 5,859,891 | A * | 1/1999 | Hibbard | 378/62 |
| 5,891,030 | A * | 4/1999 | Johnson et al. | 600/407 |
| 6,141,453 | A * | 10/2000 | Banham et al. | 382/240 |
| 6,259,820 | B1 * | 7/2001 | Stone | 382/250 |
| 6,417,860 | B1 * | 7/2002 | Migdal et al. | 345/582 |
| 6,747,649 | B1 * | 6/2004 | Sanz-Pastor et al. | 345/428 |
| 7,436,405 | B2 * | 10/2008 | Losasso Petterson et al. | 345/428 |
| 2002/0114503 | A1 * | 8/2002 | Klotz et al. | 382/131 |
| 2002/0159653 | A1 * | 10/2002 | Dekel et al. | 382/282 |
| 2002/0172408 | A1 * | 11/2002 | Saito et al. | 382/132 |
| 2003/0005140 | A1 * | 1/2003 | Dekel et al. | 709/231 |
| 2003/0016782 | A1 * | 1/2003 | Kaufman et al. | 378/50 |

(Continued)

FOREIGN PATENT DOCUMENTS

JP    6-209926    8/1994

(Continued)

OTHER PUBLICATIONS

Jin Li; Hong-Hui Sun; On interactive browsing of large images. Multimedia, IEEE Transactions on vol. 5, Issue 4, Dec. 2003 pp. 581-590.*

(Continued)

*Primary Examiner*—Vikkram Bali
*Assistant Examiner*—Julian D Brooks
(74) *Attorney, Agent, or Firm*—Pearne & Gordon LLP

(57) ABSTRACT

When processing is started, first, ROI (region of interest) is determined by user's specification. A small calculation amount image is generated in response to pointing device operation of the user, and the generated small calculation amount image is displayed. Next, a large calculation amount image in the ROI is generated, and the generated large calculation amount image in the ROI is displayed. Next, large calculation amount image in regions other than the ROI is generated, and the generated large calculation amount image in regions other than the ROI is displayed, and then the processing is terminated. At the above steps, if an image change request is made, calculation is performed again each time.

25 Claims, 13 Drawing Sheets

U.S. PATENT DOCUMENTS

| | | | |
|---|---|---|---|
| 2003/0095697 A1* | 5/2003 | Wood et al. | 382/131 |
| 2004/0167806 A1* | 8/2004 | Eichhorn et al. | 705/3 |
| 2006/0015823 A1* | 1/2006 | Chao et al. | 715/823 |

FOREIGN PATENT DOCUMENTS

| | | |
|---|---|---|
| JP | 8-336135 | 12/1996 |
| JP | 2001-313944 | 11/2001 |
| JP | 2003-325511 | 11/2003 |
| JP | 2004-97535 | 4/2004 |
| JP | 2004-289284 | 10/2004 |

OTHER PUBLICATIONS

Ali, M.; Medical image compression using set partitioning in hierarchical trees for (military) telemedicine applications. Time-scale and Time-Frequency Analysis and Applications (Ref. No. 2000/019), IEE Seminar on Feb. 29, 2000 pp. 22/1-22/5.*

Accame, M.; Granelli, F.; Hierarchical progressive image coding controlled by a region based approach□□Consumer Electronics, IEEE Transactions on Feb. 1999 vol. 45, Issue 1, pp. 13-20.*

Dilmaghani, R.; Ahmadian, A.; Oghabian, M.;A framework for progressive medical image transmission and compression. [Engineering in Medicine and Biology, 2002. 24th Annual Conference and the Annual Fall Meeting of the Biomedical Engineering Society] Conference, Proceedings of the Second Joint vol. 2, Oct. 23-26, 2002 pp. 1025-1026.*

Japanese Office Action Dated Nov. 27, 2007.

"JPEG—from concept to implementation by C++ (JPEG—gainen'kara C++niyoru jissoumade)" written by Keiwa-ku, issued by Softbank Shuppan Jigyoubu, Sep. 1, 1998, pp. 222-224.

Japanese Office Action Dated Jul. 31, 2007.

Japanese Office Action with concise statement, published Apr. 7, 2009.

* cited by examiner

STEPWISE IMAGE QUALITY IMPROVEMENT
WITH ROI HAVING HIGHER PRIORITY THAN
OTHER REGIONS

GIVEN REGION IN IMAGE

REGION DERIVED FROM VOI

GIVEN REGION SPECIFIED BY USER

REGION CALCULATED FROM POINT
SPECIFIED WITH POINTING DEVICE

REGION CALCULATED FROM POINT
SPECIFIED WITH SECOND POINTING
DEVICE SUCH AS EYE-TRACKING SYSTEM

REGION SPECIFIED FROM CAMERA
OR VIRTUAL LIGHT SOURCE

REGION CALCULATED FROM POINTS
ON IMAGE DETERMINED FROM POINTS
IN THREE-DIMENSIONAL SPACE

PLURALITY OF ROI

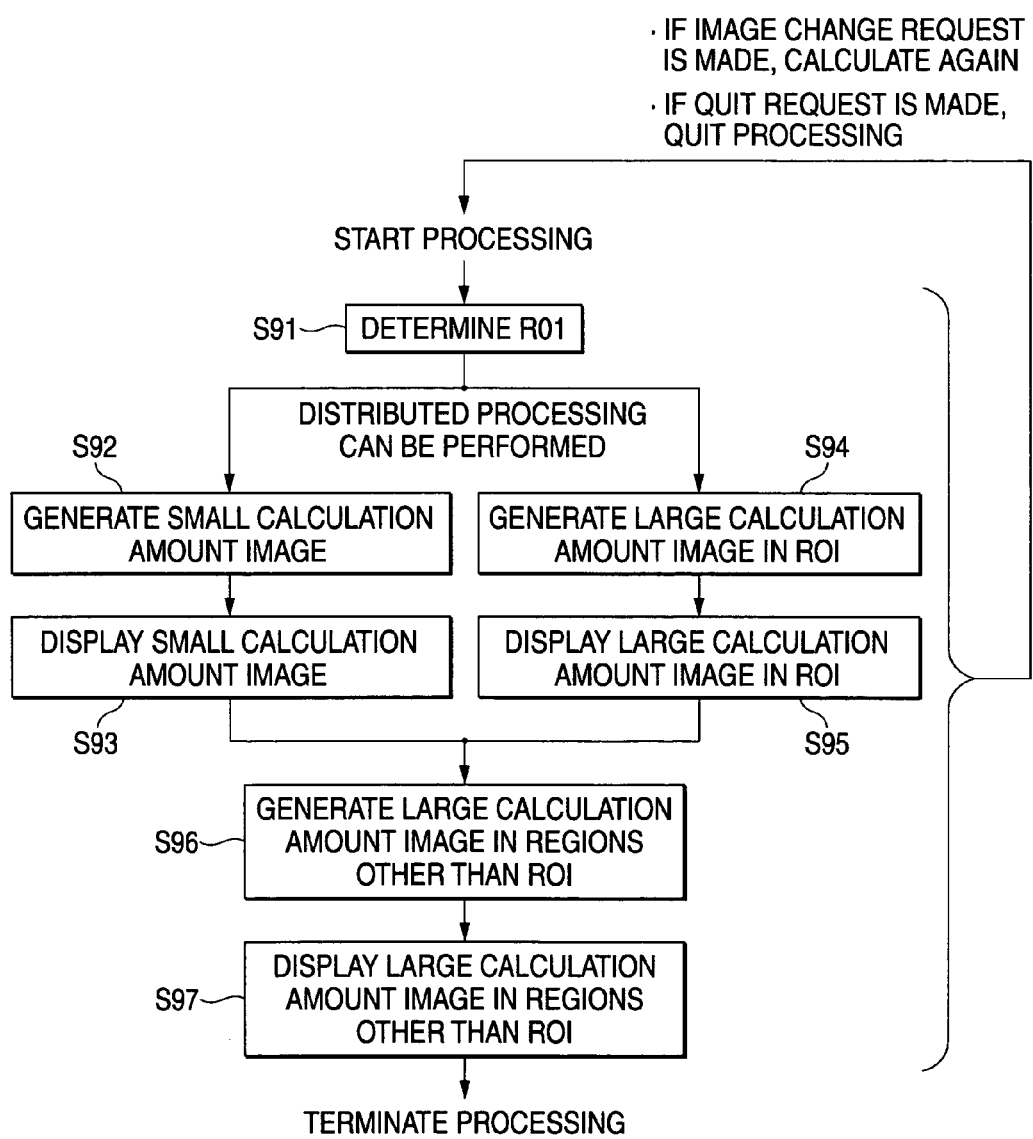

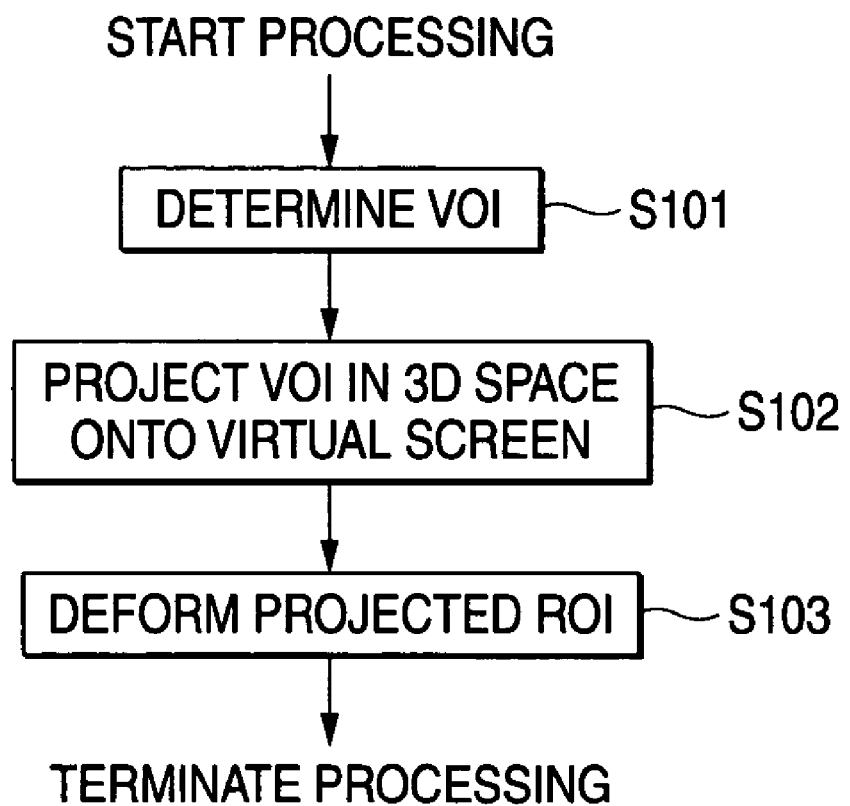

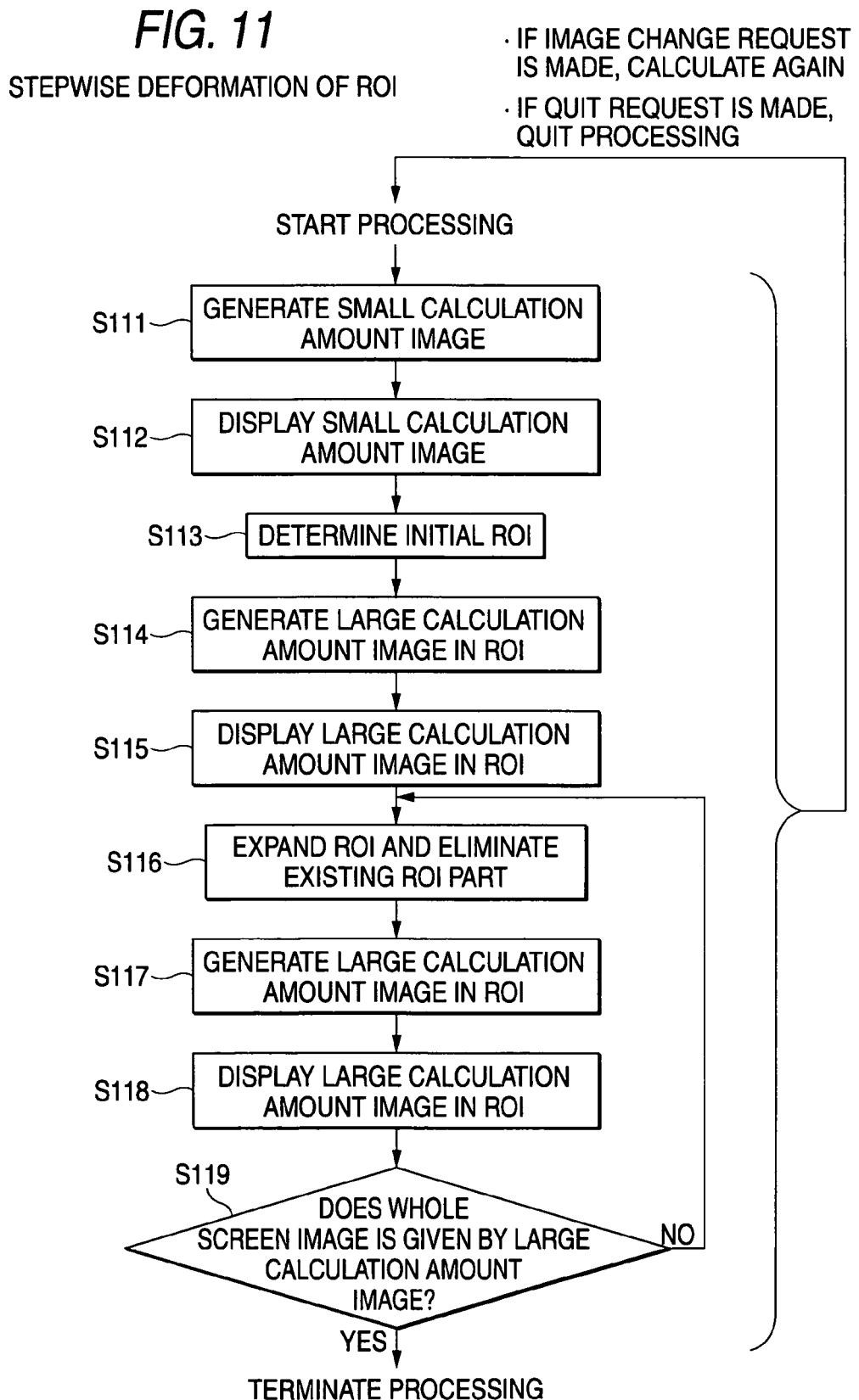

ROI CHANGING EXAMPLE
FIG. 12A
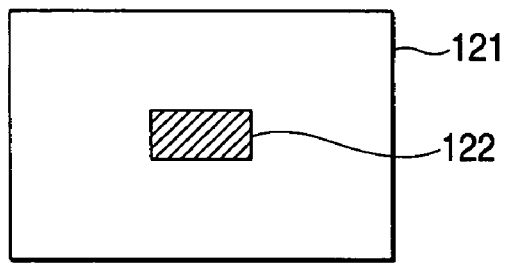
FIG. 12B
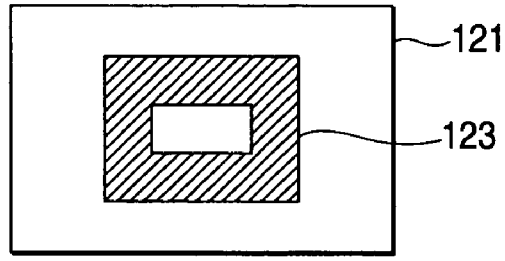
FIG. 12C
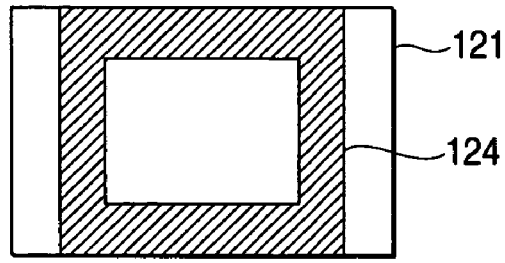
FIG. 12D
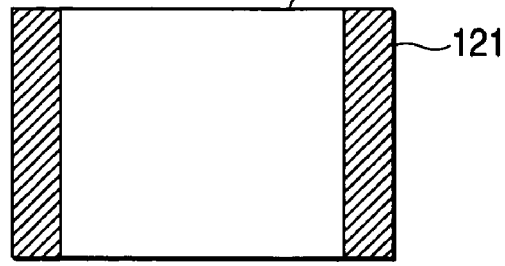

FIG. 13A STEPWISE UPDATE OF DISPLAY IMAGE QUALITY IN RELATED ART
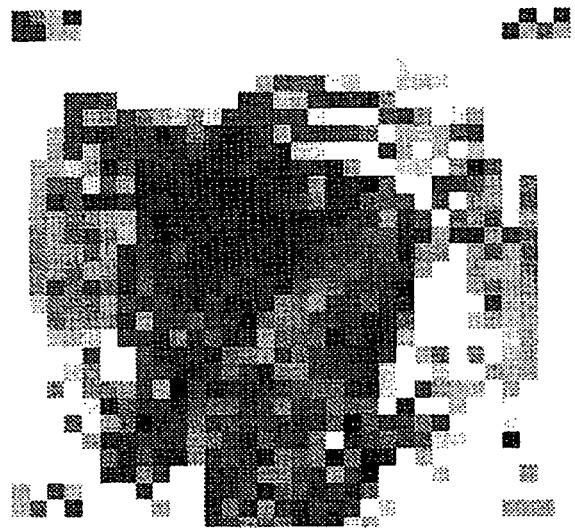
LOW IMAGE QUALITY: HIGH SPEED
FIG. 13B
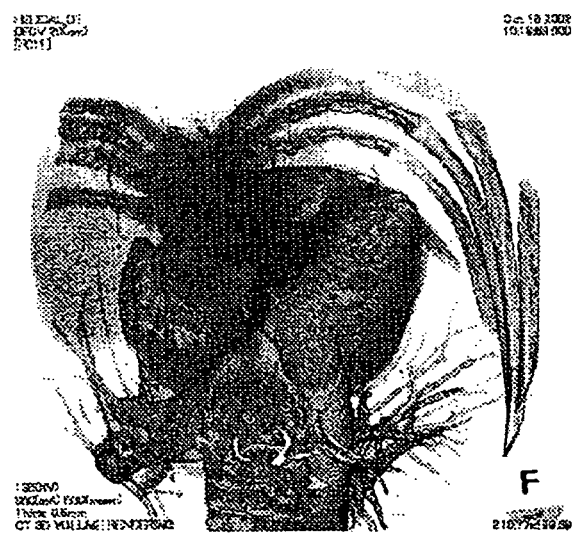
HIGH IMAGE QUALITY: LOW SPEED

COMPUTER READABLE MEDIUM FOR IMAGE PROCESSING AND IMAGE PROCESSING METHOD

This application claims foreign priority based on Japanese Patent application No. 2004-334225, filed Nov. 18, 2004, the contents of which is incorporated herein by reference in its entirety.

BACKGROUND OF THE INVENTION

1. Field of the Invention

This invention relates to a computer readable medium having a program for permitting a computer to perform image processing, and image processing method.

2. Description of the Related Art

In recent years, image processing and visualization technologies requiring complicated calculation have been used on a day-to-day basis with the progression of the image processing technology using a computer. Particularly, in the medical field, medical diagnosis is widely conducted using a CT (computed tomography) apparatus, an MRI (magnetic resonance imaging) apparatus, or PET (positron emission tomography) for enabling the user to find a focus at an early stage by visualizing the inside of a living body.

A method called volume rendering is known as a method of providing a three-dimensional image of the inside of an object. In volume rendering, a virtual ray is applied to a set of three-dimensional voxels (micro volume elements), thereby projecting an image onto a projection plane. A large number of volume rendering calculation methods are devised to meet various usages; representative volume rendering calculation methods include ray casting method, MIP (maximum intensity projection) method, and MPR (multi planer reconstruction) method.

FIGS. 13A and 13B are explanatory diagrams of a method of related art for improving the image quality of a display image stepwise. FIG. 13A shows an image displayed first when an image is displayed. The first displayed image is of low image quality because high-speed processing is required for displaying the image. FIG. 13B shows a display screen after a lapse of some time from the state in FIG. 13A; it takes time until the image is displayed although the image is of high image quality. To process and display an image, generally it takes time to generate a high-quality image because the calculation amount is large (large calculation amount image), and it does not take time to generate a low-quality image because the calculation amount is small (small calculation amount image), although it depends on the image quality optimization degree and the subjective element.

Thus, to observe the diseased area by the image of the inside of a human body photographed by a CT apparatus and the like, when the user (doctor, etc.,) searches for the observation part of the diseased area or is operating the apparatus to change the scale factor, a coarse image as shown in FIG. 13A is displayed with a good response, and when the user stops operating the apparatus and observes the observation part in detail, a high-quality image as shown in FIG. 13B is generated and is displayed.

On the other hand, as an image generating technology to improve the ease of use in displaying an image, for example, progressive JPEG is available as one of the expanded specifications of JPEG, which is an image file format often used in the Internet, etc. For a usual JPEG image, an image of a predetermined resolution is displayed gradually from the top of a screen as the image is downloaded into a computer of a user; when an image generated in the progressive JPEG format is downloaded, a vague image appears on the whole screen at first, and the image on the whole screen becomes clear gradually with the progression of downloading the image. Thus, the user can grasp an approximate image even while the image is being downloaded. (Refer to "JPEG—from concept to implementation by C++ (JPEG—gainen'kara C++ niyoru jissoumade)" written by Keiwa-kui, issued by Softbank Shuppan Jigyoubu, Sep. 1, 1998, p. 222-224.)

By the way, in medical diagnosis using an image, generally the user conducts a diagnosis using a large calculation amount image of high image quality, and thus the large calculation amount image of the observation target needs to be generated again and again for display to provide information required for diagnosis. Therefore, for example, if the user wants to change the angle or the scale factor to see the region of interest such as the diseased area of the observation target, the user must wait for a long time until a large calculation amount image for the whole display screen including the region of interest is generated and is displayed each time the user operates the apparatus.

SUMMARY OF THE INVENTION

It is therefore an object of the invention to provide an image processing program capable of displaying an image of a region in a short time wherein image generating process is executed.

In an embodiment of the invention, a computer readable medium having a program including a set of instructions for permitting a computer to perform image processing and display an image on a display screen, the set of instructions comprises executing a first image generating process which generates an image requiring a small calculation amount for at least one region provided in the display screen, executing a second image generating process which is different from the first image generating process and generates an image requiring a large calculation amount for the at least one region, and displaying sequentially each of the images generated by executing the first image generating process and the second image generating process in the display screen.

According to the invention, the image generating process is executed being divided into more than one process, whereby the time required for one process is shortened, so that the image of the region wherein the image generating process is executed can be displayed in a short time. For example, to conduct a diagnosis of a diseased area with a medical image, only the diseased area set to the region of interest in a low-resolution image of the whole including the diseased area and its periphery can be displayed at high resolution, so that a precise diagnosis can be conducted in a short time.

In an embodiment of the invention, second image generating process is executed by using a result of the first image generating process or information which is generated based on a process of the first image generating process.

In an embodiment of the invention, the set of instructions further comprises expanding the at least one region stepwise to which at least one of the first image generating process and the second image generating process is applied.

In an embodiment of the invention, the at least one region comprises a plurality of regions, and at least one of the first image generating process and the second image generating process is executed in accordance with a priority assigned to the plurality of regions respectively.

In an embodiment of the invention, the display of the images is stopped when an image display target is changed, and the first image generating process and the second image generating process are executed based on the change.

In an embodiment of the invention, the set of instructions further comprises extracting a two-dimensional region of interest as the at least one region from a three-dimensional region of interest which is specified in a three-dimensional space.

In an embodiment of the invention, the set of instructions further comprises extracting a two-dimensional region of interest which is specified with at least one pointing device as the at least one region.

In an embodiment of the invention, the first image generating process and the second image generating process are executed by performing volume rendering.

In an embodiment of the invention, the first image generating process and the second image generating process are executed by a graphic processing unit.

In an embodiment of the invention, an image processing method comprises executing a first image generating process which generates an image requiring a small calculation amount for at least one region provided in the display screen, executing a second image generating process which is different from the first image generating process and generates an image requiring a large calculation amount for the at least one region, and displaying sequentially each of the images generated by executing the first image generating process and the second image generating process in the display screen.

BRIEF DESCRIPTION OF THE DRAWINGS

FIG. 9 is a flowchart for executing generation of a small calculation amount image and generation of a large calculation amount image in parallel in an embodiment.

FIG. 10 is a flowchart for determining ROI (region of interest as two-dimensional region of interest) from VOI (volume of interest as three-dimensional region of interest) in the three-dimensional image processing of an embodiment.

FIG. 11 is a flowchart for expanding ROI (region of interest) stepwise in an embodiment.

FIGS. 12A, 12B, 12C and 12D show a stepwise changing example of ROI.

FIGS. 13A and 13B are explanatory diagrams in the case where image quality of a display image is improved stepwise by a method of related art.

DESCRIPTION OF THE PREFERRED EMBODIMENTS

Figure 1A:
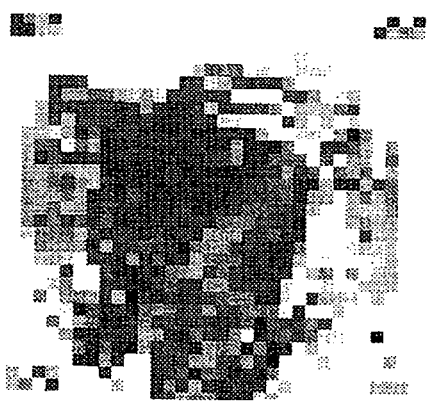
FIGS. 1A, 1B and 1C are drawings to show a display screen example of three-dimensional image processing to describe an embodiment of the invention.
Figure 1B:
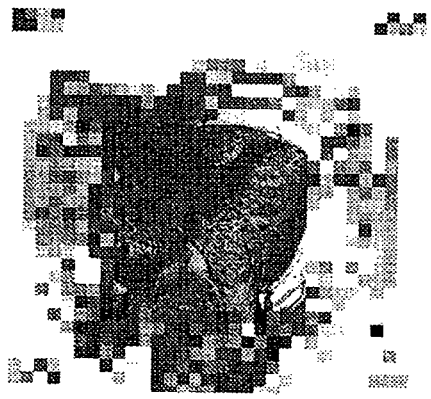
Figure 1C:
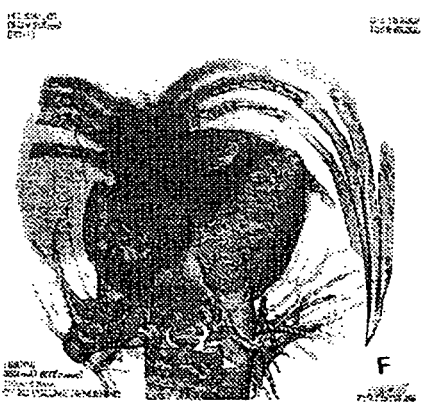

FIGS. 1A, 1B and 1C are drawings to show a display screen example of three-dimensional image processing to describe one embodiment of the invention; they show a display example for executing image generating process preferentially in ROI (region of interest) of an observation target provided in a display screen, and expanding the ROI stepwise for improving the image quality.

In a diagnosis using a medical image such as a CT image, the user (doctor, etc.,) operates a pointing device such as a mouse for the image of the observation target displayed on a display screen, thereby changing the scale factor, the viewpoint direction, etc., of the observation target for searching for the diagnosis part of the diseased area, etc. FIG. 1A shows an image in which the user is operating the pointing device. Thus, when the user operates the pointing device for searching for the diagnosis part, small calculation amount image having low-resolution and low operation load is displayed almost in real time.

FIG. 1B shows an image when a certain amount of time has elapsed since the user stopped operating the pointing device. In the embodiment, it is assumed that the center portion of the display screen is previously specified as ROI (region of interest). When the user stops operating the pointing device, the image to be displayed is determined, and process of generating a large calculation amount image having high-resolution and high operation load is executed preferentially in the ROI (region of interest), and then a generated image is displayed.

In this case, small calculation amount image may be displayed as in FIG. 1A during the generating process of a large calculation amount image for the ROI (region of interest), and the large calculation amount image in the whole ROI may be displayed upon completion of the generating process of the large calculation amount image in the ROI. Alternatively, the large calculation amount image being generated may be displayed in the ROI range during the generating process of the large calculation amount image in the ROI. In this case, the ROI image is displayed so that it becomes gradually clear (high resolution). At the time when the large calculation amount image is displayed in the ROI, the small calculation amount image remains displayed in the surrounding of the ROI, as shown in FIG. 1B.

Thus, in the three-dimensional image processing of the embodiment, ROI has a higher priority compared to other regions in executing the generating process of the large calculation amount image, whereby the operation load can be decreased, so that ROI image generated by executing the generating process of the large calculation amount image can be displayed in a short time. Therefore, user can check the large calculation amount image in ROI displayed in a short time after operating the pointing device, so that user can obtain necessary information from the large calculation amount image in ROI without waiting for completion of the execution of the large calculation amount image generating process in regions other than ROI.

FIG. 1C shows an image when a certain amount of time has further elapsed since the state in FIG. 1B. When the predetermined time has elapsed since the state in FIG. 1B, the generating process of the large calculation amount image for the whole observation target in the display screen is completed, and the generated large calculation amount image is displayed on the whole screen.

Thus, according to the three-dimensional image processing of the embodiment, the user can check the part more important for the user according to the large calculation amount image in the ROI (region of interest) generated preferentially, while seeing the whole observation target based on the small calculation amount image which can be generated in a short time with a low operation load. Accordingly, operability of the user conducting, for example, a diagnosis using a medial image in real time can be improved as compared with the technique in the related art which requires the user to wait for display of the large calculation amount image of the whole observation target on the display screen.

The factors that determine the calculation amount (operation load) to display an image include image resolution, volume resolution, interpolation precision, calculation step interval of virtual ray, presence or absence of anti-aliasing, the image type (MIP method, ray casting, etc.), and skip of some calculation (the presence or absence of gradient calculation in ray casting or the like); generally, the large calculation amount image has high-quality and is a detailed image.

Figure 2A:
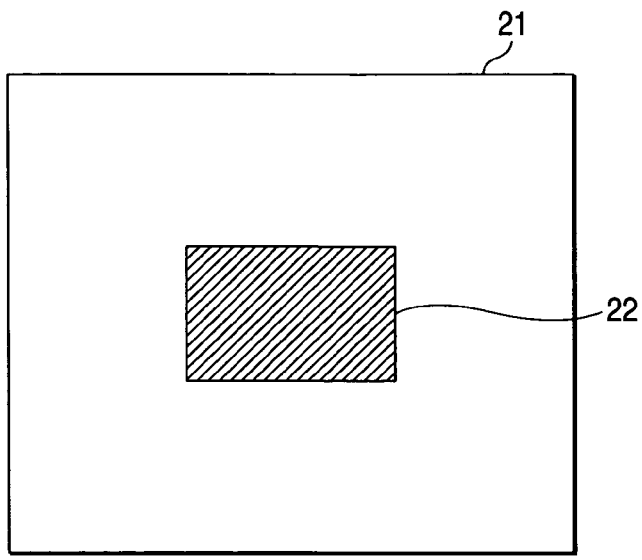
FIGS. 2A and 2B show a determination method 1 of ROI (region of interest) in an embodiment.
Figure 2B:
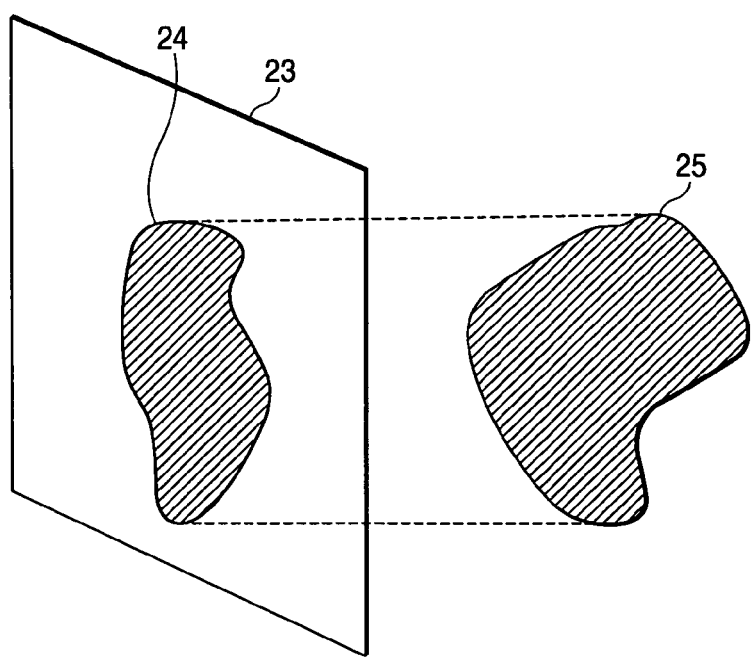

FIGS. 2A and 2B show a determination method 1 of ROI (region of interest) in the embodiment. FIG. 2A shows the case where a predetermined region in a display screen 21 is set as an ROI (region of interest) 22. User can previously specify the ROI 22 in the display screen 21, or can also select one ROI from a plurality of default ROI. User can operate a pointing device such as a mouse so that a necessary image is included in the range of the ROI 22, thereby preferentially displaying the large calculation amount image of the portion corresponding to the ROI 22. A large calculation amount image corresponding to the region surrounding the ROI 22 is generated and di splayed, after the large calculation amount image corresponding to the ROI 22 is generated.

FIG. 2B shows the correspondence between ROI (two-dimensional region of interest) and VOI (volume of interest as three-dimensional region of interest). In the embodiment, a VOI (three-dimensional region of interest) 25 can also be specified as the region for preferentially generating and displaying a large calculation amount image. In this case, even when the user operates the pointing device such as a mouse to change image display by specifying the necessary part with three-dimensional data, large calculation amount image for ROI (two-dimensional region of interest) 24 corresponding to the specified VOI (three-dimensional region of interest) 25 can be displayed preferentially on a display screen 23.

Figure 3A:
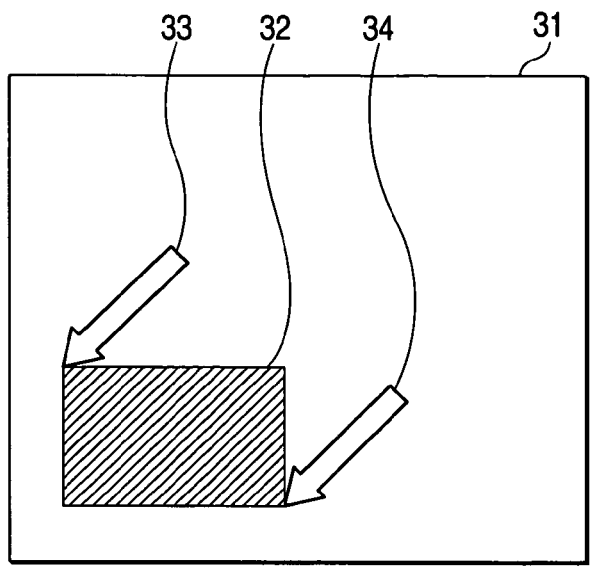
FIGS. 3A and 3B show a determination method 2 of ROI (region of interest) in an embodiment.
Figure 3B:
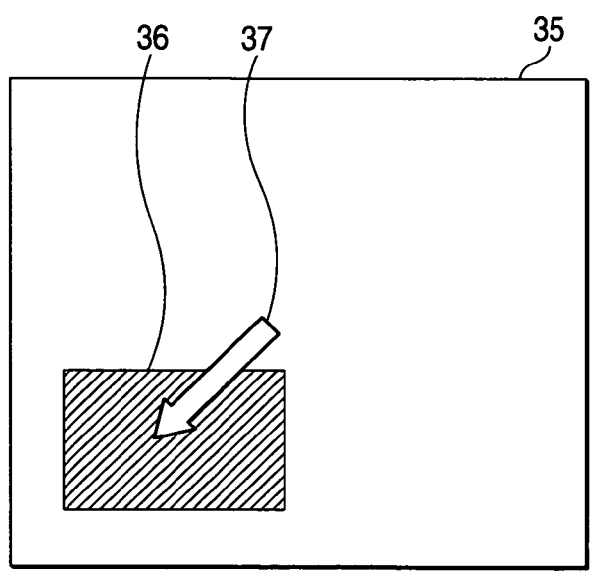

FIGS. 3A and 3B show a determination method 2 of ROI (region of interest) in the embodiment. FIG. 3A shows the case where the user operates a pointing device such as a mouse to specify an ROI 32. When the user specifies two points by pointers 33 and 34, a rectangular region formed by the two points is specified as the ROI 32. When an image is displayed on a screen 31 in response to user's operation of the pointing device, a large calculation amount image is preferentially generated and is displayed in the range of the ROI 32.

FIG. 3B shows the case where a predetermined region calculated from the specification point of a pointer 37 is determined to be an ROI 36. For example, a range may be determined according to the scale factor of the current displayed image, and the region within the range from the point that the user specified by the pointer 37 may be specified as the ROI 36. Then a large calculation amount image is preferentially generated and is displayed in the range of the ROI 36 a display screen 35.

Figure 4A:
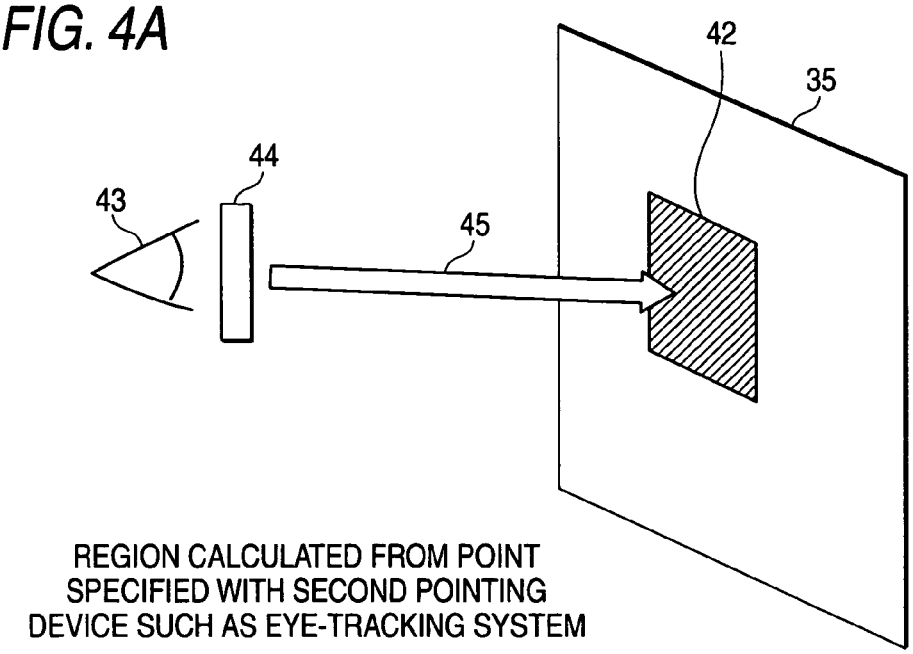
FIGS. 4A and 4B show a determination method 3 of ROI (region of interest) in an embodiment.
Figure 4B:
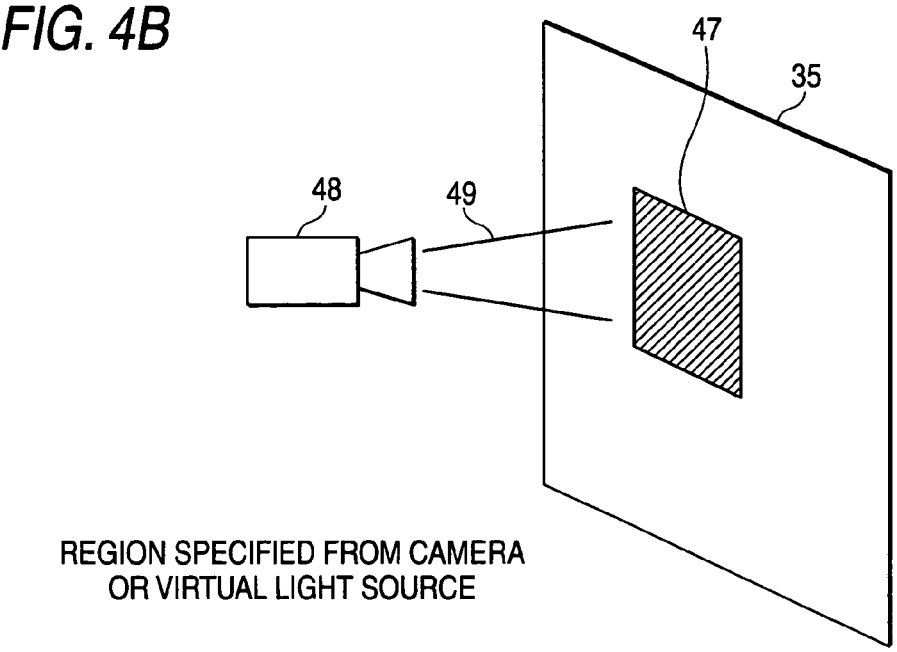

FIGS. 4A and 4B show a determination method 3 of ROI (region of interest) in the embodiment. FIG. 4A shows the case where a region calculated from the point specified with a second pointing device which is different from a first pointing device such as a mouse is set as an ROI 42. In this example, a eye-tracking system 44 mounted adjacent to an eye 43 of a doctor conducting an operation is shown as the second pointing device. The eye-tracking system 44 can detect a sight line 45 of the user by detecting motion of the eye 43 of the user. To conduct an operation while seeing the affected part in the image, for example, the doctor cannot specify the ROI 42 with the first pointing device such as the mouse because the doctor has his or her hands full. Therefore, the user can specify the ROI 42 with the eye-tracking system 44, thereby performing smooth screen operation. One of a plurality of pointing devices can also be used as a pointing device dedicated to ROI specification. It is also possible to specify ROI by voice by using a voice recognition unit.

FIG. 4B shows the case where a region specified from a virtual camera 48 or a virtual light source (not shown) is set as an ROI 47. To conduct a medical diagnosis using a CT image, a virtual viewpoint is set in the inside of a human body, whereby an image simulating an endoscopic examination can be formed. In this case, the ROI 47 can also be specified according to the range in which an organ is photographed by the virtual camera 48 or the range in which a light 49 from the virtual light source is applied to an organ.

Figure 5A:
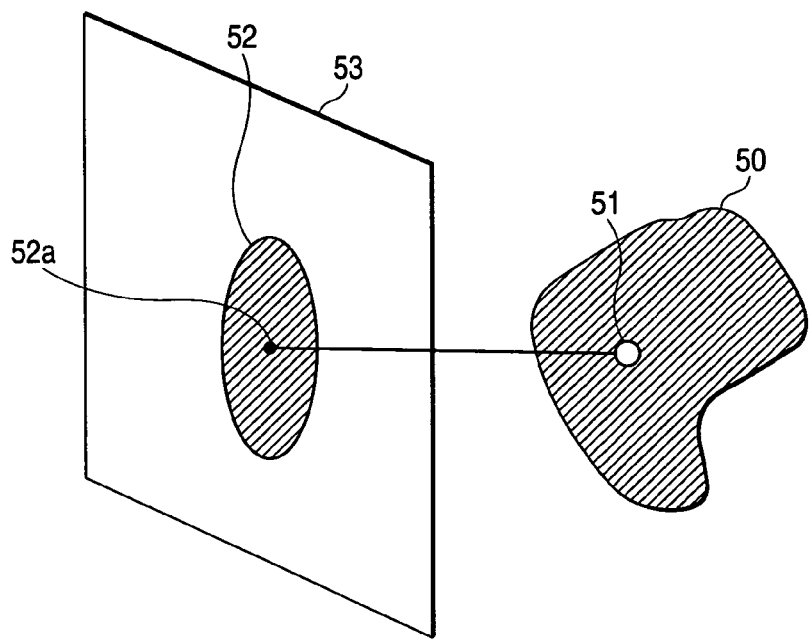
FIGS. 5A and 5B show a determination method 4 of ROI (region of interest) in an embodiment.
Figure 5B:
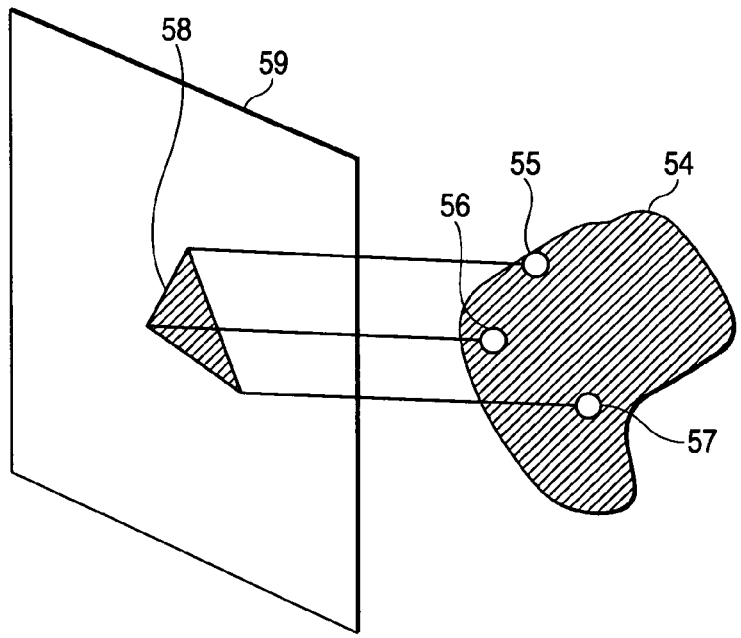

FIGS. 5A and 5B show a determination method 4 of ROI (region of interest) in the embodiment. FIG. 5A shows the case where a region calculated from a point 52a provided by projecting a point 51 in an observation target 50 in a three-dimensional space onto a two-dimensional virtual screen 53 is set as an ROI 52. User can specify ROI in the display screen by specifying the region of interest corresponding to the point 51 in the observation target 50 in the three-dimensional space.

FIG. 5B shows the case where a region calculated from a plurality of points provided by projecting a plurality of points 55, 56, and 57 in an observation target 54 in a three-dimensional space onto a two-dimensional virtual screen 59 is set as an ROI 58.

User can specify ROI in the display screen by specifying a predetermined range of the observation target 54 in the three-dimensional space. For calculation, directions and position information of two-dimensional coordinates and three-dimensional coordinates can be used respectively.

A marker can be used as a point in a three-dimensional space. The marker is an instrument fixed in or nearby the body of a patient to register an image at the time of a CT examination, etc. The marker is clearly photographed, and thus it becomes easy to mechanically determine the positional relationship between the image and the photographed person. The marker can also be set virtually.

Figure 6:
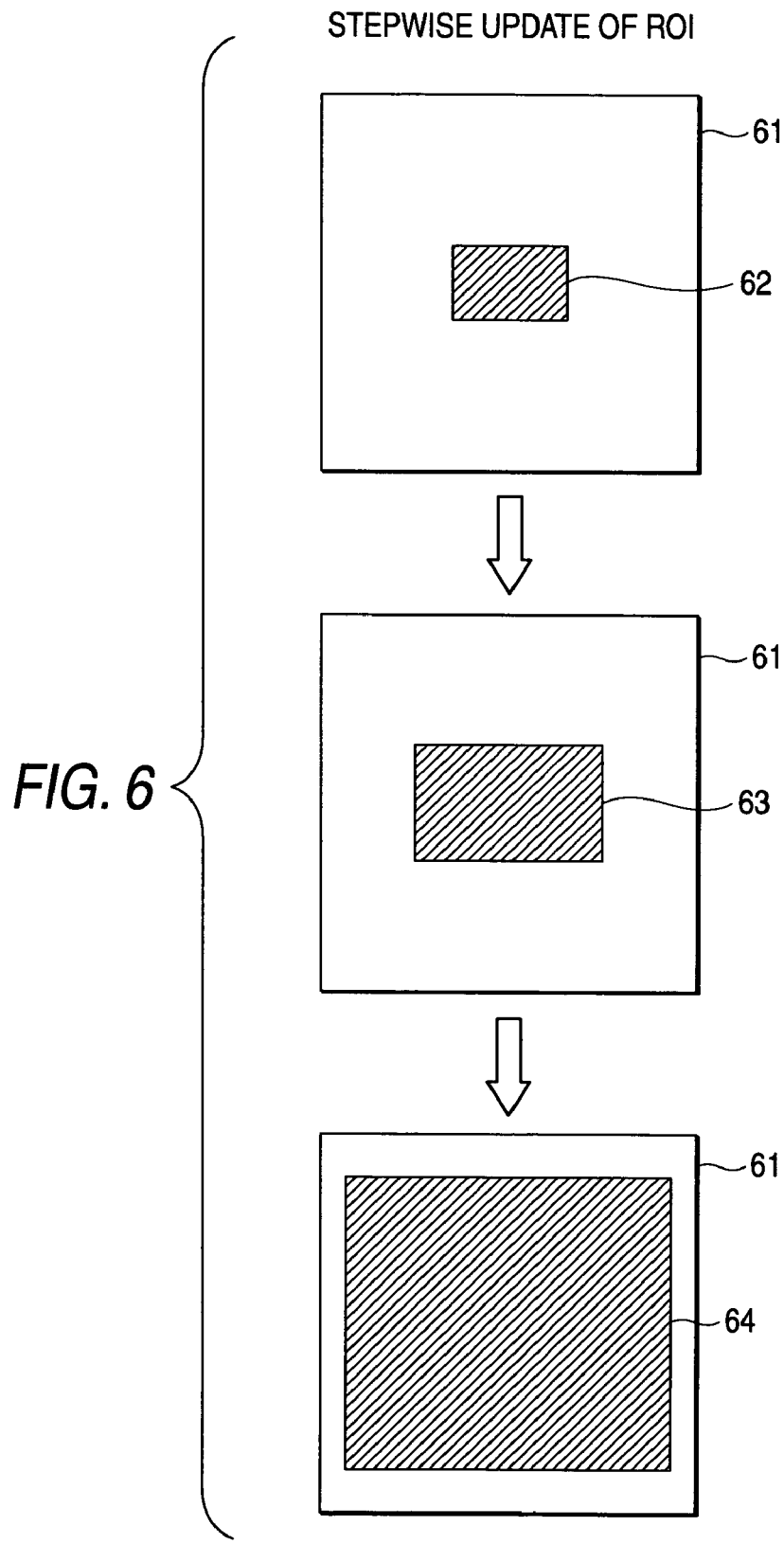
FIG. 6 shows the case where an ROI (region of interest) is expanded stepwise with the passage of time in an embodiment.

FIG. 6 shows the case where an ROI (region of interest) is expanded stepwise with the passage of time in the embodiment. In the embodiment, the ROI in which a large calculation amount image is displayed is expanded stepwise as ROI 62, ROI 63, and ROI 64, so that the user can predict the time taken to display the large calculation amount image on the whole of a screen 61. Thus, the user can be relieved of stress before the large calculation amount image is displayed on the whole screen.

Figure 7:
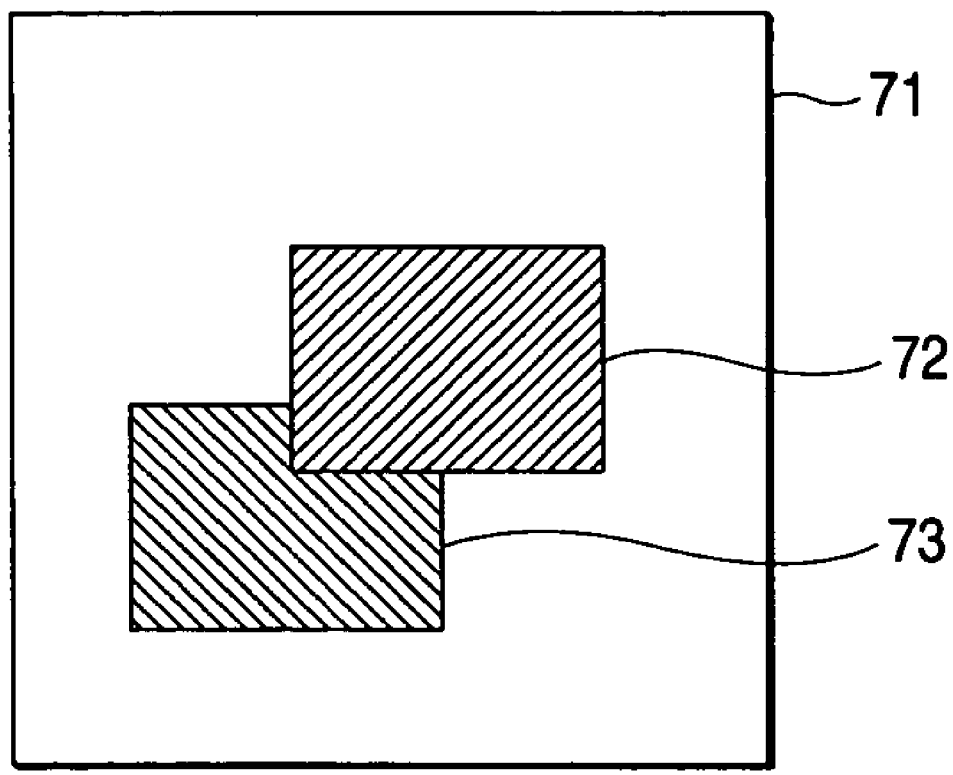
FIG. 7 shows the case where a plurality of ROI 72 and 73 are set in an embodiment.

FIG. 7 shows the case where a plurality of ROI 72 and 73 are set in the embodiment. For example, the ROI 72 in the center part of a screen 71 and the ROI 73 having a predetermined positional relationship with the ROI 72 are set, whereby both a target organ and another organ having a predetermined positional relationship with the target organ can be set as the regions of interest for preferentially displaying a large calculation amount image.

Priorities may be assigned to image generating process for the plurality of ROI 72 and 73. As priorities are assigned to the processes, for example, the region for displaying a large calculation amount image can be changed in response to the display angle or the display scale factor, and the convenience of image diagnosis can be improved.

A determination method of the priority to the image generating process for the plurality of ROI 72 and 73 is described. The priority is an order in which the plurality of ROI is generated. Furthermore, the plurality of ROI specified by the user using the pointing device such as the mouse may be assigned a higher priority. Furthermore, the plurality of ROI specified by the user using the second pointing device such as the eye-tracking system may be assigned a higher priority. Furthermore, the plurality of ROI near the center of the display screen may be assigned a higher priority. Furthermore, the plurality of ROI near the point on the display screen corresponding to a point in a three-dimensional space may be assigned a higher priority. Furthermore, the plurality of ROI specified by the user or application may be assigned a higher priority. Furthermore, the specifying methods mentioned above may be combined.

Apart or the entire of image processing of the embodiment can be executed by a GPU (graphic processing unit). The GPU is a processing unit designed to be specialized in particularly for image processing as compared with a general-purpose CPU, and is installed in a computer separately from a general-purpose CPU.

Figure 8:
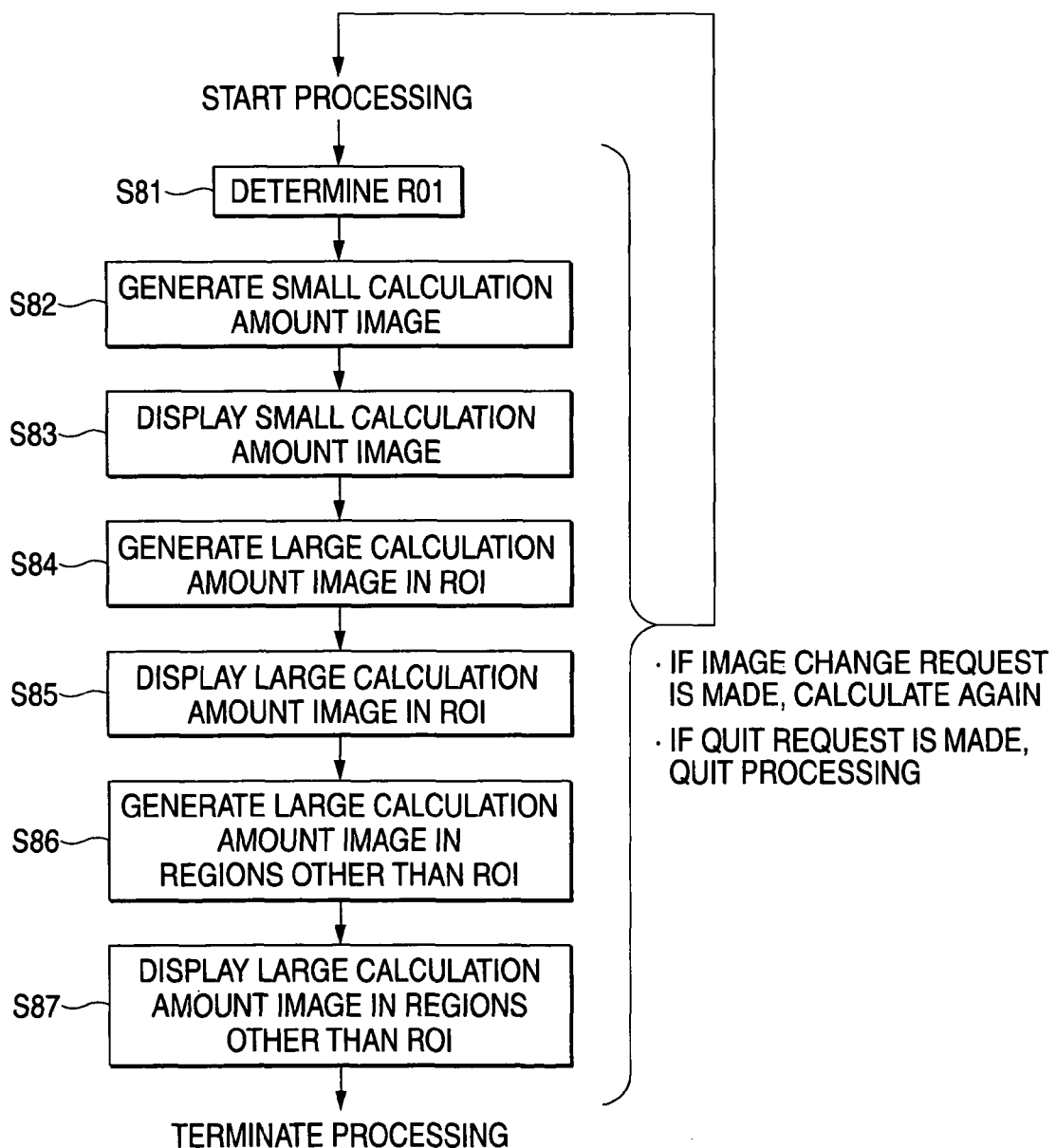
FIG. 8 is a flowchart for executing generation of a small calculation amount image and generation of a large calculation amount image in sequence in an embodiment.

Next, three-dimensional image processing in the embodiment will be discussed with a flowchart. FIG. 8 is a flowchart for executing generation of a small calculation amount image and generation of a large calculation amount image in sequence in the embodiment. When processing is started, first the ROI (region of interest) of the observation target in the display screen and the priority of the ROI are determined by the user's specification (step S81). Then, generating process of a small calculation amount image is executed for the observation target in the display screen in response to pointing device operation of the user (step S82), and the generated small calculation amount image is displayed (step S83). The small calculation amount image can be generated and displayed in a short time, and thus can be displayed quickly in response to the pointing device operation of the user.

Next, generating process of a large calculation amount image is executed for the ROI of the observation target provided in the display screen (step S84), and the generated large calculation amount image in the ROI is displayed (step S85). It takes a certain time to generate and display a large calculation amount image. In the embodiment, however, generating process of a large calculation amount image is performed for the ROI which is a partial region of the display screen, whereby the image required by the user can be displayed in a short time as compared with the case where generating process of a large calculation amount image is performed for the whole display screen as in the related art.

Next, generating process of a large calculation amount image in regions other than the ROI is executed (step S86), and the generated large calculation amount image in regions other than the ROI is displayed (step S87), and then the processing is terminated.

At the above steps, if a user or program command (change request) is entered, processing is interrupted at any timing and calculation is again performed under a new condition. At this time, the data of the image being generated may be discarded.

FIG. 9 is a flowchart for executing generation of a small calculation amount image and generation of a large calculation amount image in parallel in the embodiment. When processing is started, first, ROI (region of interest) and the priority of the ROI are determined by the user's specification (step S91). Next, for example, processing is divided for a plurality of processors connected to a network to perform distributed processing, and small calculation amount image generating process is executed in some processor (step S92), and the generated small calculation amount image is displayed (step S93). Large calculation amount image generating process in the ROI is executed in another processor (step S94), and the generated large calculation amount image in the ROI is displayed (step S95).

Next, large calculation amount image generating process in regions other than the ROI is executed (step S96), and the generated large calculation amount image in regions other than the ROI is displayed (step S97), and then the processing is terminated. At the above steps, if a user or program command (change request) is entered, the processing is interrupted at any timing and calculation is again performed under a new condition.

FIG. 10 is a flowchart for determining ROI (region of interest as two-dimensional region of interest) from VOI (volume of interest as three-dimensional region of interest) in the three-dimensional image processing of the embodiment.

In the embodiment, when processing is started, first the VOI (three-dimensional region of interest) in a three-dimensional space and the priority of the VOI are determined by the user's specification (step S101). Next, the VOI in the three-dimensional space is projected onto a two-dimensional virtual screen to generate ROI (two-dimensional region of interest) (step S102). Then, the projected ROI is deformed so as to match the display screen (step S103), and the processing is terminated.

Step S103 for deforming the projected ROI is not indispensable, but becomes necessary if it is convenient to expand the ROI because there is no margin in the VOI contours just only by projecting the VOI onto the ROI.

At the above steps, if a user or program command (change request) is entered, the processing is interrupted at any timing and calculation is again performed under a new condition. At this time, if parallel image processing is being performed, all parallel processing is interrupted.

FIG. 11 is a flowchart for expanding ROI (region of interest) stepwise in the embodiment. FIGS. 12A, 12B, 12C and 12D show a stepwise changing example of ROI. In the embodiment, when processing is started, first, small calculation amount image generating process of the whole observation target in the display screen 121 is executed (step S111), and the generated small calculation amount image is displayed (step S112). Next, an initial ROI 123 (see FIG. 12B) is determined by the user's specification (step S113), a large calculation amount image in the determined initial ROI 123 is generated (step S114), and the generated large calculation amount image in the initial ROI 123 is displayed (step S115).

Next, the initial ROI 123 is expanded at a predetermined scale factor to an ROI 124 (see FIG. 12C), and the part of the initial ROI 123 is eliminated (step S116), large calculation amount image generating process in the expanded ROI 124 is executed (step S117), and a large calculation amount image in the expanded ROI 124 is displayed (step S118). Next, whether or not the whole display screen image is given by the large calculation amount image is determined (step S119). If the whole screen image is not given by the large calculation amount image (NO), the process returns to step S116, and the ROI is expanded at a predetermined scale factor, and the processing is repeated. On the other hand, if the whole display screen image is given by the large calculation amount image (YES at step S119), the processing is terminated (see FIG.

12D). If a user or program command (change request) is entered, the processing is interrupted at any timing and calculation is again performed under a new condition.

Thus, the ROI is expanded stepwise and the large calculation amount image displayed on the display screen is gradually expanded, so that the user can predict the time taken to display the large calculation amount image on the whole display screen. Accordingly, the user can be relieved of stress before the large calculation amount image is displayed on the whole display screen.

In the above description of the embodiments, the processing is explained in terms of two images of different image quality (small and large calculation amount images), but more number of images of different image quality (for example, a medium calculation amount image) may be used, so that the quality of the display image is improved gradually through multiple steps.

In the above embodiments, VOI is specified by the user, but VOI may be an extracted region or a preset region. Furthermore, VOI may be a point, a line, or a plane rather than a region.

In the above embodiments, when a large calculation amount image is generated after a small calculation amount image is generated, information provided by calculating the small calculation amount image is not used, but can also be used.

For example, the small calculation amount image may be constructed of a part of the pixels of the large calculation amount image and only the remaining pixels not included in the small calculation amount image may be calculated in large calculation amount image calculation.

Furthermore, voxels effective for image processing can be detected at the small calculation amount image calculation stage, and processing can be optimized using the information for a large calculation amount image.

In the above embodiments, full size image of small calculation amount image is generated. However, small calculation amount image may be generated just in region out of ROI. This is useful when large calculation amount image is coming quick. This occasion often occurs when parallel process is performed.

In the above embodiments, a large calculation amount image is displayed after a small calculation amount image. However, the calculation time is not always proportional to the calculation amount if dedicated hardware is used, or parallelization or optimization of processing is performed. The calculation time also depends on the order or frequency that the image data is used, because previous calculation result can be used for later calculation. Particularly, an image used for special application tends to take long time in calculation as compared with the calculation amount. Thus, a large calculation amount image may be displayed preceding a small calculation amount image.

The above embodiments are embodiments in volume rendering processing. However, if an image is updated interactively in the image processing, surface rendering processing, moving image processing, or two-dimensional image processing may be adopted.

The above embodiments are embodiments in an image provided by photographing parts of a human body, but the invention is not limited to that. The invention can be applied not only to living organism tissues of human bodies, animals, vegetables, etc., but also to geological survey, mineral search, image processing for seeing structural materials of machines and devices and electric circuit patterns, LSI fault diagnosis, computer graphics which does not specify subjects, and the like.

According to the invention, image generating process is executed being divided into more than one process, whereby the time required for one process is shortened, so that the image of the region wherein the image generating process is executed can be displayed in a short time.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A non-transitory computer readable medium having a program including a set of instructions for permitting a computer to perform volume rendering on volume data and display an image on a display screen, said set of instructions comprising:

upon changing a scale factor and/or a viewpoint direction, displaying the image wherein different portions of the displayed image are one-at-a-time sequentially volume rendered such that respective resolutions of the different portions of the displayed image are one-at-a-time automatically sequentially increased over time from an initial image resolution, wherein a display of a first portion with increased resolution is maintained while at least a second portion that is outside of the first portion in the displayed image, and that surrounds the first portion in the displayed image, is volume rendered then displayed with increased resolution, resulting in an overall resolution of the displayed image automatically increasing over time from the initial image resolution, wherein the step of displaying comprises the steps of:

(a) executing a first image generating process which generates a first image of a first two-dimensional region of the displayed image, requiring a first calculation amount for a first three-dimensional region of the volume data that corresponds to the first two-dimensional region, wherein the volume data includes a plurality of voxels, and wherein said first two-dimensional region is said first portion;

(b) automatically executing a second image generating process which is different from said first image generating process and generates a second image requiring a second calculation amount for said first three-dimensional region, wherein said second calculation amount is larger than said first calculation amount;

(c) displaying sequentially each of the first and second images in the displayed image such that a resolution of the first two-dimensional region is sequentially increased from the initial image resolution to a higher resolution due to the second image replacing the first image in the displayed image;

(d) while the second image is displayed in the displayed image, automatically executing a third image generating process which is different from said first image generating process and generates a third image requiring a third calculation amount for a second three-dimensional region of the volume data, said second three-dimensional region corresponding to a second two-dimensional region of the displayed image, wherein said third calculation amount is larger than said first calculation amount, and wherein said second two-dimensional region is said second portion and said third image is outside of and surrounds said first and second images; and (e) displaying the third image in the displayed image with the second image.

2. The computer readable medium as claimed in claim 1, wherein said second image generating process is executed by using a result of said first image generating process or information which is generated based on a process of said first image generating process.

3. The computer readable medium as claimed in claim 1, said set of instructions further comprising: expanding said first two-dimensional region stepwise to which at least one of said first image generating process and said second image generating process is applied.

4. The computer readable medium as claimed in claim 1, wherein said first two dimensional region comprises a plurality of two-dimensional regions, and at least one of said first image generating process and said second image generating process is executed in accordance with a priority assigned to said plurality of two-dimensional regions respectively.

5. The computer readable medium as claimed in claim 1, wherein the display of said first and second images is stopped when an image display target is changed, and said first image generating process and said second image generating process are executed based on the change.

6. The computer readable medium as claimed in claim 1, said set of instructions further comprising: extracting a two-dimensional region of interest as said first two-dimensional region from a three-dimensional region of interest which is specified in a three-dimensional space.

7. The computer readable medium as claimed in claim 1, said set of instructions further comprising: extracting a two-dimensional region of interest which is specified with at least one pointing device as said first two-dimensional region.

8. The computer readable medium as claimed in claim 1, wherein said first image generating process and said second image generating process are executed by performing volume rendering.

9. The computer readable medium as claimed in claim 1, wherein said first image generating process and said second image generating process are executed by a graphic processing unit.

10. An image processing method for performing volume rendering on volume data using a processor and displaying an image on a display screen comprising the steps of:
providing the processor for performing the volume rendering;
providing the display screen;
receiving the volume data, wherein the volume data is volume data of tissue, and wherein the volume data is obtained based on a scan of the tissue using one of a tomographic scanning apparatus and a magnetic resonance imaging scanning apparatus;
upon changing a scale factor and/or a viewpoint direction, displaying the image, based on the volume data of tissue, wherein different portions of the displayed image are one-at-a-time sequentially volume rendered such that respective resolutions of the different portions of the displayed image are one-at-a-time automatically sequentially increased over time from an initial image resolution, wherein a display of a first portion with increased resolution is maintained while at least a second portion that is outside of the first portion in the displayed image, and that surrounds the first portion in the displayed image, is volume rendered then displayed with increased resolution, resulting in an overall resolution of the displayed image automatically increasing over time from the initial image resolution, wherein the step of displaying comprises the steps of:

(a) executing a first image generating process which generates a first image of a first two-dimensional region of the displayed image, requiring a first calculation amount for a first three-dimensional region of the volume data that corresponds to the first two-dimensional region, wherein the volume data includes a plurality of voxels, and wherein said first two-dimensional region is said first portion;

(b) automatically executing a second image generating process which is different from said first image generating process and generates a second image requiring a second calculation amount for said first three-dimensional region, wherein said second calculation amount is larger than said first calculation amount;

(c) displaying sequentially each of the first and second images in the displayed image such that a resolution of the first two-dimensional region is sequentially increased from the initial image resolution to a higher resolution due to the second image replacing the first image in the displayed image;

(d) while the second image is displayed in the displayed image, automatically executing a third image generating process which is different from said first image generating process and generates a third image requiring a third calculation amount for a second three-dimensional region of the volume data, said second three-dimensional region corresponding to a second two-dimensional region of the displayed image, wherein said third calculation amount is larger than said first calculation amount, and wherein said second two-dimensional region is said second portion and said third image is outside of and surrounds said first and second images; and (e) displaying the third image in the displayed image with the second image.

11. The image processing method as claimed in claim 10, wherein said second image generating process is executed by using a result of said first image generating process or an information which is generated based on a process of said first image generating process.

12. The image processing method as claimed in claim 10 further comprising: expanding said first two-dimensional region stepwise to which at least one of said first image generating process and said second image generating process is applied.

13. The image processing method as claimed in claim 10, wherein said first two dimensional region comprises a plurality of two-dimensional regions, and at least one of said first image generating process and said second image generating process is executed in accordance with a priority assigned to said plurality of two-dimensional regions respectively.

14. The image processing method as claimed in claim 10, wherein the display of said first and second images is stopped when an image display target is changed, and said first image generating process and said second image generating process are executed based on the change.

15. The image processing method as claimed in claim 10 further comprising: extracting a two-dimensional region of interest as said first two-dimensional region from a three-dimensional region of interest which is specified in a three-dimensional space.

16. The image processing method as claimed in claim 10 further comprising: extracting a two-dimensional region of interest which is specified with at least one pointing device as said first two-dimensional region.

17. The image processing method as claimed in claim 10, wherein said first image generating process and said second image generating process are executed by performing volume rendering.

18. The image processing method as claimed in claim 10, wherein said first image generating process and said second image generating process are executed by a graphic processing unit.

19. An image processing method for performing volume rendering on volume data using a processor and displaying an entire image on a display screen comprising the steps of:
   providing the processor for performing the volume rendering;
   providing the display screen;
   receiving the volume data, wherein the volume data is volume data of tissue, and wherein the volume data is obtained based on a scan of the tissue using one of a tomographic scanning apparatus and a magnetic resonance imaging scanning apparatus;
   upon changing a scale factor and/or a viewpoint direction, displaying, based on volume rendering using the volume data of tissue, the entire image by first volume rendering and displaying an image of an initial two-dimensional region of the entire image then automatically expanding the initial two-dimensional region stepwise so as to one-at-a-time sequentially volume render and display images of larger two dimensional regions that include the initial two-dimensional region and regions surrounding the initial two-dimensional region, until the entire image is displayed, wherein the step of displaying comprises the steps of:
   (a) executing a first image generating process which generates the image of the initial two-dimensional region of the entire image, said first image generating process requiring a first calculation amount for a first three-dimensional region of the volume data that corresponds to the initial two-dimensional region, wherein the volume data includes a plurality of voxels;
   (b) displaying the image of the initial two-dimensional region;
   (c) while the image of the initial two-dimensional region is displayed, automatically executing a second image generating process, which is different from said first image generating process, and generates an image of a larger two-dimensional region of the entire image that is larger than, and includes and surrounds, the initial two-dimensional region, said second image generating process requiring a second calculation amount using a second three-dimensional region of the volume data that is larger than, and includes, the first three-dimensional region, wherein said second calculation amount is larger than said first calculation amount;
   (d) displaying the image of the larger two-dimensional region of the entire image such that the displayed initial two-dimensional region is automatically expanded stepwise;
   (e) while the image of the larger two-dimensional region is displayed, automatically executing a third image generating process, which is different from said first and second image generating processes, and generates an image of a further larger two-dimensional region of the entire image that is larger than both of, and includes and surrounds both of, said initial two-dimensional region and said larger two-dimensional region, said third image generating process requiring a third calculation amount using a third three-dimensional region of the volume data that is larger than both of, and includes both of, the first and second three-dimensional regions, wherein said third calculation amount is larger than both of said first and second calculation amounts;
   (f) displaying the image of the further larger two-dimensional region of the entire image such that the displayed initial two-dimensional region is further automatically expanded stepwise.

20. The image processing method as claimed in claim 19, wherein said second image generating process is executed by using a result of said first image generating process or an information which is generated based on a process of said first image generating process.

21. The image processing method as claimed in claim 19, wherein the display of either one of the image of the initial two-dimensional region and the image of the larger two-dimensional region is stopped when an image display target is changed, and said first image generating process and said second image generating process are executed based on the change.

22. The image processing method as claimed in claim 19 further comprising: extracting a two-dimensional region of interest as said initial two-dimensional region from a three-dimensional region of interest which is specified in a three-dimensional space.

23. The image processing method as claimed in claim 19 further comprising: extracting a two-dimensional region of interest which is specified with at least one pointing device as said initial two-dimensional region.

24. The image processing method as claimed in claim 19, wherein said first image generating process and said second image generating process are executed by performing volume rendering.

25. The image processing method as claimed in claim 19, wherein said first image generating process and said second image generating process are executed by a graphic processing unit.

* * * * *